United States Patent
Elms et al.

(10) Patent No.: US 7,362,553 B2
(45) Date of Patent: Apr. 22, 2008

(54) ARC FAULT CIRCUIT INTERRUPTER AND METHOD FOR INHIBITING SERIES ARC PROTECTION BASED ON DIMMER PHASE ANGLE

(75) Inventors: Robert T. Elms, Monroeville, PA (US); Kevin L. Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 342 days.

(21) Appl. No.: 11/147,505

(22) Filed: Jun. 8, 2005

(65) Prior Publication Data

US 2006/0279883 A1 Dec. 14, 2006

(51) Int. Cl.
H02H 3/00 (2006.01)
(52) U.S. Cl. ....................................................... 361/42
(58) Field of Classification Search .................... 361/42
See application file for complete search history.

(56) References Cited

U.S. PATENT DOCUMENTS

| | | | |
|---|---|---|---|
| 4,376,243 A * | 3/1983 | Renn et al. ................... 219/514 |
| 5,224,006 A | 6/1993 | MacKenzie et al. | |
| 5,691,869 A | 11/1997 | Engel et al. | |
| 5,818,237 A | 10/1998 | Zuercher et al. | |
| 5,839,092 A * | 11/1998 | Erger et al. ................... 702/58 |
| 5,933,305 A * | 8/1999 | Schmalz et al. .............. 361/42 |
| 6,246,556 B1 | 6/2001 | Haun et al. | |
| 6,259,996 B1 | 7/2001 | Haun et al. | |
| 6,477,021 B1 | 11/2002 | Haun et al. | |
| 6,590,754 B1 * | 7/2003 | Macbeth ....................... 361/42 |
| 6,650,516 B2 | 11/2003 | Langford et al. | |
| 6,653,219 B2 | 11/2003 | Fukuyama | |
| 6,839,208 B2 | 1/2005 | Macbeth et al. | |
| 7,136,265 B2 * | 11/2006 | Wong et al. ................... 361/42 |
| 2003/0072113 A1 * | 4/2003 | Wong et al. ................... 361/5 |
| 2003/0099070 A1 * | 5/2003 | Macbeth et al. ............... 361/5 |
| 2003/0227290 A1 | 12/2003 | Parker | |
| 2004/0042137 A1 * | 3/2004 | Wong et al. ................... 361/42 |
| 2006/0274460 A1 * | 12/2006 | Zuercher et al. .............. 361/42 |

OTHER PUBLICATIONS

Microchip Technoogy Inc., "Save More Energy with PIC Microcontrollers featuring nanoWatt Technology", www.microchip.com/nanowatt, 2003, 2 pp.
IAEI NEWS, "Five New Categories for AFCI Devices Under UL 1699", 2003, p. 94.
Underwriters Laboratories, "Arc Fault Circuit Interrupters—UL 1699", Dec. 2000, pp. 33, 34, 43-45.

* cited by examiner

Primary Examiner—Michael Sherry
Assistant Examiner—Christopher J Clark
(74) Attorney, Agent, or Firm—Martin J. Moran (57) ABSTRACT

An arc fault circuit breaker includes line and load terminals, separable contacts electrically connected between the terminals, a current sensor adapted to sense current associated with a load and flowing between the terminals and through the separable contacts. An arc fault detection circuit provides series arc protection and generates a trip signal responsive to the sensed current. The arc fault detection circuit collects a plurality of samples of the sensed current over plural line cycles, determines that the load is a dimmer-controlled load, determines a phase angle at which the sensed current begins conduction within one of the line cycles, and determines that the phase angle consistently moves in a forward direction or a reverse direction. If so, then series arc protection is responsively inhibited. An operating mechanism opens the separable contacts responsive to the trip signal.

11 Claims, 8 Drawing Sheets

ARC FAULT CIRCUIT INTERRUPTER AND METHOD FOR INHIBITING SERIES ARC PROTECTION BASED ON DIMMER PHASE ANGLE

CROSS-REFERENCE TO RELATED APPLICATION

This application is related to commonly assigned:

U.S. patent application Ser. No. 10/895,158, filed Jul. 20, 2004, entitled "Arc Fault Circuit Interrupter".

BACKGROUND OF THE INVENTION

1. Field of the Invention

This invention relates generally to circuit interrupters and, more particularly, to circuit interrupters including an arc fault trip mechanism which responds to sputtering arc faults. The invention also relates to methods of providing series arc protection.

2. Background Information

Arcing is a luminous discharge of electricity across an insulating medium, usually accompanied by the partial volatilization of electrodes. An arc fault is an unintentional arcing condition in an electrical circuit. Arc faults can be caused, for instance, by worn insulation between adjacent bared conductors, by exposed ends between broken conductors, by faulty electrical connections, and in other situations where conducting elements are in close proximity.

Arc faults in systems can be intermittent since the magnetic repulsion forces generated by the arc current force the conductors apart to extinguish the arc. Mechanical forces then bring the conductors together again in order that another arc is struck.

Circuit interrupters include, for example, circuit breakers, contactors, motor starters, motor controllers, other load controllers and receptacles having a trip mechanism. Circuit breakers are generally old and well known in the art. Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. An armature, which is attracted by the sizable magnetic forces generated by a short circuit or fault, also unlatches, or trips, the operating mechanism.

Recently, there has been considerable interest in providing protection against arc faults. Because of their intermittent and high impedance nature, arc faults do not generate currents of either sufficient instantaneous magnitude or sufficient average RMS current to trip the conventional circuit interrupter. Even so, the arcs can cause damage or start a fire if they occur near combustible material. It is not practical to simply lower the pick-up currents on conventional circuit breakers, as there are many typical loads, which draw similar currents and would, therefore, cause nuisance trips. Consequently, separate electrical circuits have been developed for responding to arc faults. See, for example, U.S. Pat. Nos. 5,224,006; and 5,691,869.

For example, an arc fault circuit interrupter (AFCI) is a device intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from ground faults (e.g., greater than 40 mA) and line-to-neutral faults (e.g., greater than 75 A); (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from line-to-ground faults (e.g., greater than 75 A) and line-to-neutral faults (e.g., 5 to 30 A, and greater than 75 A); (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

UL 1699 is a specification that governs the performance of AFCI products including branch/feeder type (AVZQ); outlet circuit type (AWCG); portable type (AWDO); cord type (AWAY); and combination type (AWAH) AFCIs. A carbonized path arc clearing time test is conducted in which the total clearing time before the AFCI trips shall not exceed specified arc test clearing times based upon different levels of test current (i e., 5 A; 10 A; 15 A or 20 A; 22.5 A or 30 A).

U.S. patent application Ser. No. 10/895,158 discloses that various arc fault algorithms look for cycle-to-cycle changes in load current. Unfortunately, those arc fault algorithms might sometimes interpret changes in load current caused by adjusting the brilliance of incandescent lighting with a dimmer to be an arc. Hence, this may cause nuisance tripping of series arc protection devices.

Accordingly, there is room for improvement in arc fault circuit interrupters and in methods for providing series arc protection.

SUMMARY OF THE INVENTION

These needs and others are met by the present invention, which monitors load currents and inhibits series arc protection if characteristics of a changing dimmer phase angle are detected. If the load is identified as a dimmer and if the phase angle at which the load current begins conduction consistently moves in a given direction (i.e., either consistently increasing or decreasing), then series arc protection is temporarily inhibited. This provides clear discrimination between arcs (which strike randomly and cause random fluctuations in the onset of current conduction) and lighting dimmers (in which the onset of current conduction is either consistent from cycle to cycle or, else, predictably changes).

In accordance with one aspect of the invention, an arc fault circuit interrupter for an electrical circuit including a load comprises: a line terminal; a load terminal; separable contacts electrically connected between the line terminal and the load terminal; a current sensor adapted to sense current associated with the load and flowing between the line terminal and the load terminal and through the separable contacts, the sensed current including a plurality of line cycles; at least one arc fault detection circuit adapted to provide series arc protection and to generate a trip signal responsive to the sensed current from the current sensor, one of the at least one arc fault detection circuit being adapted to collect a plurality of samples of the sensed current over the line cycles, determine that the load is a dimmer-controlled load, determine a phase angle at which the sensed current begins conduction within one of the line cycles, and determine that the phase angle consistently moves in a forward direction or a reverse direction and responsively inhibit the series arc protection; and an operating mechanism adapted to open the separable contacts responsive to the trip signal.

The arc fault detection circuit may determine that the phase angle consistently moves in the forward direction for at least three of the line cycles. The arc fault detection circuit may determine that the phase angle consistently moves in the reverse direction for at least three of the line cycles.

The line cycles may include a positive half cycle and a negative half cycle. The arc fault detection circuit may collect the samples of the sensed current for a current one of the line cycles substantially during one of the positive half cycle and the negative half cycle, and may identify one of the samples that corresponds to an onset of current conduction of the sensed current for the dimmer-controlled load.

As another aspect of the invention, a method of enabling or disabling series arc protection for an electrical circuit including a load comprises: providing series arc protection for the electrical circuit; sensing current associated with the load and flowing in the electrical circuit, the sensed current including a plurality of line cycles; collecting a plurality of samples of the sensed current over the line cycles; determining that the load is a dimmer-controlled load; determining a phase angle at which the sensed current begins conduction within one of the line cycles; and determining that the phase angle consistently moves in a forward direction or a reverse direction and responsively inhibiting the providing series arc protection.

The method may further comprise periodically collecting the samples over at least a portion of each of the line cycles; employing an index number with each of the samples for one of the lines cycles; identifying one of the samples that corresponds to an onset of current conduction of the sensed current for the dimmer-controlled load for a current one of the line cycles; determining that the identified one of the samples that corresponds to an onset of current conduction of the sensed current for the dimmer-controlled load for a current one of the line cycles is different from another one of the samples that corresponds to an onset of current conduction of the sensed current for the dimmer-controlled load for another one of the line cycles prior to the current one of the line cycles; and storing the index number of the identified one of the samples in a first-in first-out array having a plurality of elements.

The method may employ the first-in first-out array having at least three of the elements; and determine from the elements if the index number of the identified one of the samples that corresponds to an onset of current conduction of the sensed current for the dimmer-controlled load for the current one of the line cycles has either consecutively increased or has consecutively decreased.

The method may further comprise employing the index number of the identified one of the samples that corresponds to an onset of current conduction of the sensed current for the dimmer-controlled load for the current one of the line cycles that has consecutively increased or has consecutively decreased; and inhibiting the providing series arc protection during a predetermined time.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a single pole branch/feeder arc fault circuit interrupter (AFCI), although the invention is applicable to a wide range of AFCIs including one or more poles.

Figure 1:
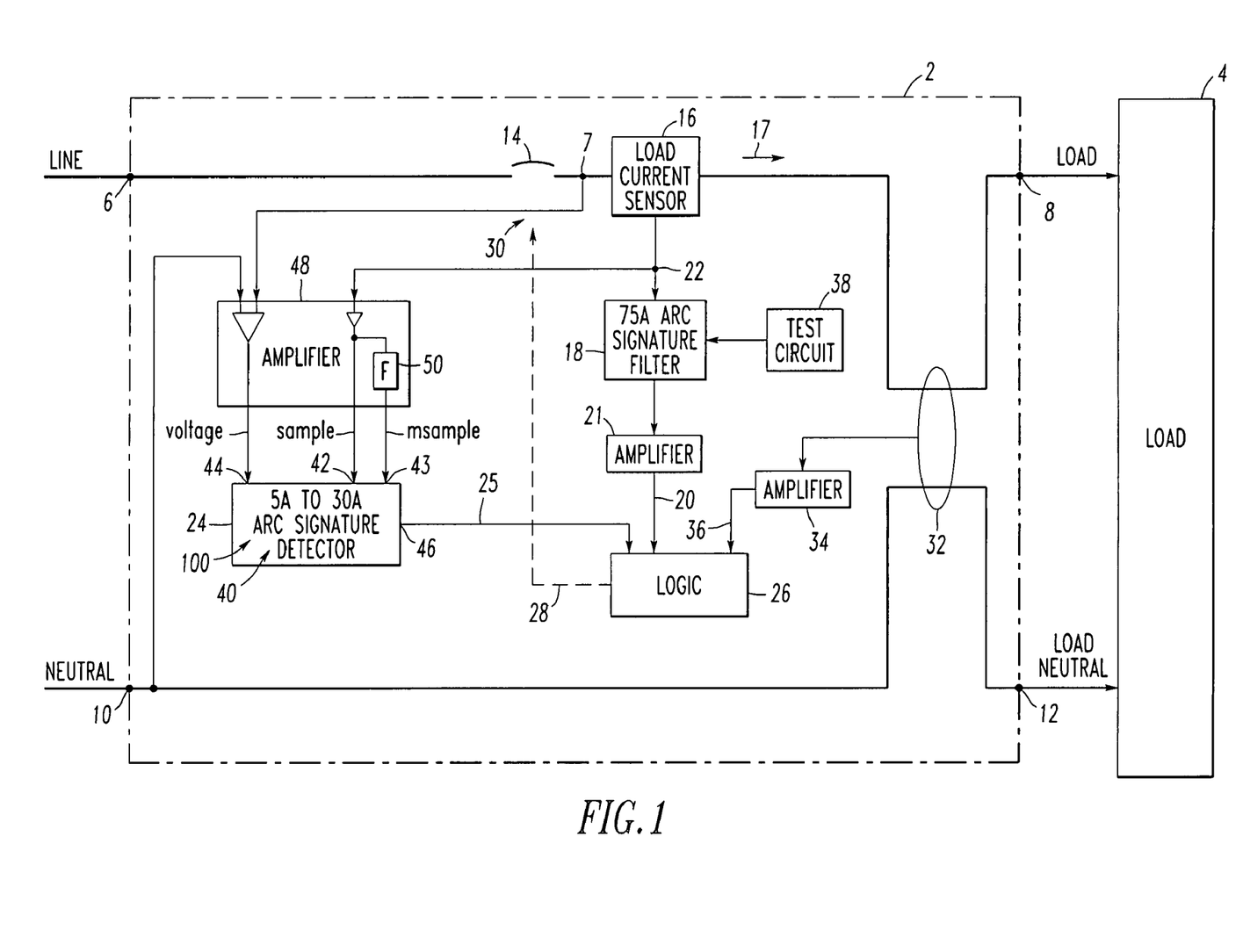
FIG. 1 is a block diagram of a single pole branch/feeder arc fault circuit interrupter in accordance with the present invention.

Referring to FIG. 1, an arc fault circuit interrupter, such as circuit breaker 2, is for an electrical circuit associated with one or more possible different types of loads, such as load 4. The circuit breaker 2 includes a line terminal 6 and a load terminal 8. If the circuit breaker 2 is optionally adapted to provide ground fault protection, then it also includes a neutral terminal 10 and a load neutral terminal 12. As is conventional, separable contacts 14 are electrically connected between the line terminal 6 and the load terminal 8. A load current sensor 16 is adapted to sense current 17 flowing between the line and load terminals 6,8 and through the separable contacts 14. Here, the current 17 is associated with one of the different types of loads and includes a plurality of alternating current line cycles. As is also conventional, a first arc fault detection circuit 18 (e.g., a 75 A arc signature filter) is adapted to generate a first trip signal 20 through amplifier 21 responsive to the sensed current 22 from the current sensor 16. Suitable arc fault detection circuits, such as the circuit 18, are disclosed, for example, in U.S. Pat. Nos. 5,224,006; 5,691,869; and 5,818,237, which are hereby incorporated by reference herein.

A second arc fault detection circuit 24 (e.g., 5 A to 30 A arc signature detector) is adapted to collect a plurality of samples of the sensed current 22 for a current one of the line cycles and a plurality of samples of the sensed current 22 for one of the line cycles prior to the current one of the line cycles, to determine a total current value from a peak current of the samples of the sensed current for the current one of the line cycles, to employ the total current value and some of the samples to determine the type of the load 4, and to generate a second trip signal 25 responsive to the sensed current 22 and the determined load type. A trip circuit 26 is adapted to generate a third trip signal 28 responsive to the first and second trip signals 20,25. An operating mechanism 30 is adapted to open the separable contacts 14 responsive to the third trip signal 28.

Although not required, the circuit breaker 2 may include a ground fault current sensor 32 (e.g., personnel protection; 5 mA; equipment protection; 30 mA) and a corresponding amplifier 34, which generates a ground fault trip signal 36 to the trip circuit 26. As is also not required, the first arc fault detection circuit 18 includes a suitable test circuit 38, which generates the first trip signal 20 in response to a user request.

The second arc fault detection circuit 24 may be, for example, a suitable PIC® model microprocessor (µP) as marketed by Microchip Technology Inc. of Chandler, Ariz., including, for example, internal memory for a suitable firmware routine 40, plural analog inputs, such as 42,43,44, and plural I/O lines, such as output 46. Upstream of the second arc fault detection circuit 24 is a suitable amplifier circuit 48, which buffers the analog sensed current 22 from the load current sensor 16 to the first analog input 42 (sample), which buffers and filters the analog sensed current 22 from the load current sensor 16 to the second analog input 43 (msample), and which buffers the switched line voltage 7 from the load side of the separable contacts 14 to the third analog input 44 (voltage). Preferably, the amplifier circuit 48 includes a filter circuit (F) 50, which is a low pass circuit having a cutoff frequency of about 1 kHz for the second analog input 43.

Figure 2A:
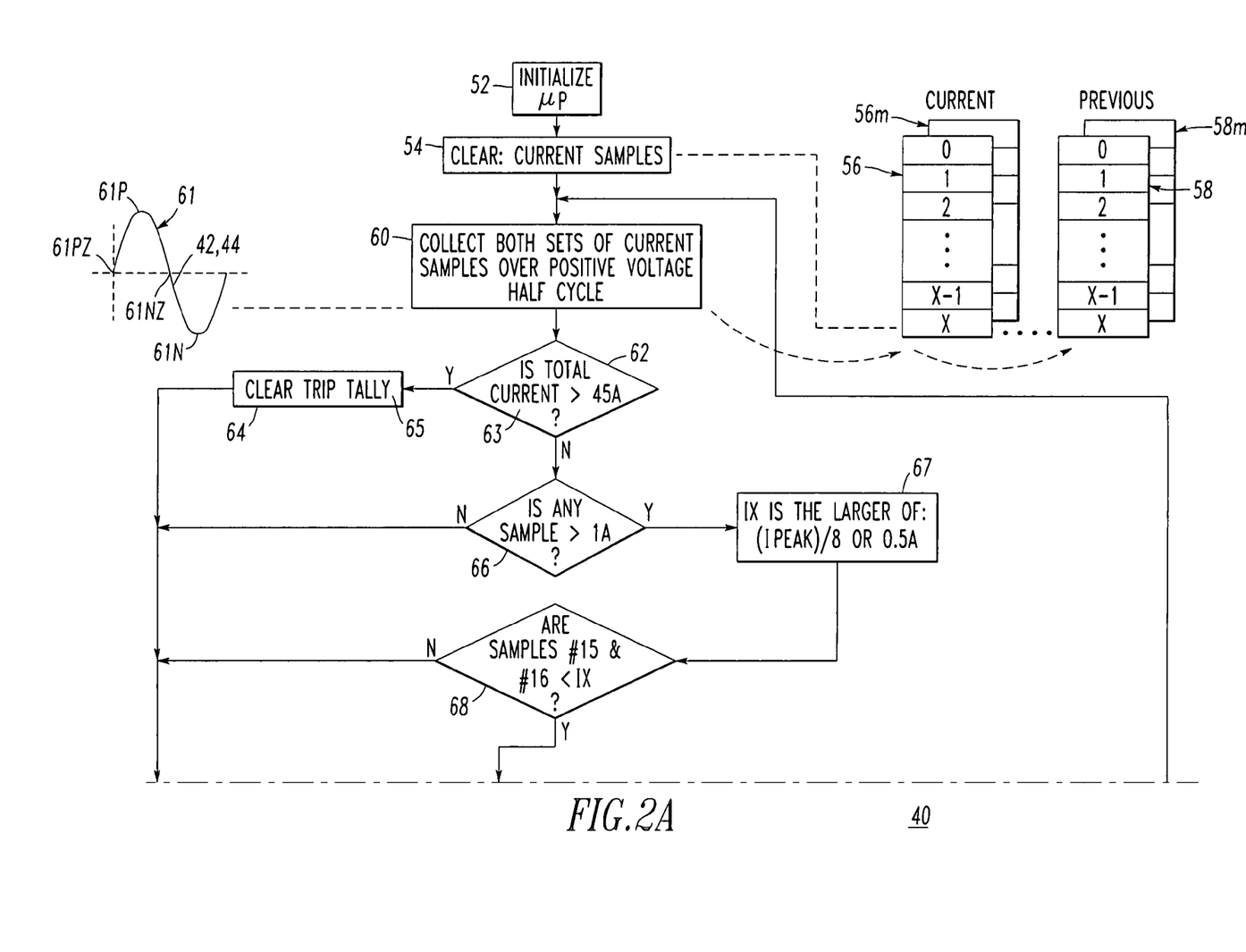
FIGS. 2A-2B form a flowchart of a current sampling routine to collect current samples for the processor of FIG. 1.
Figure 2B:
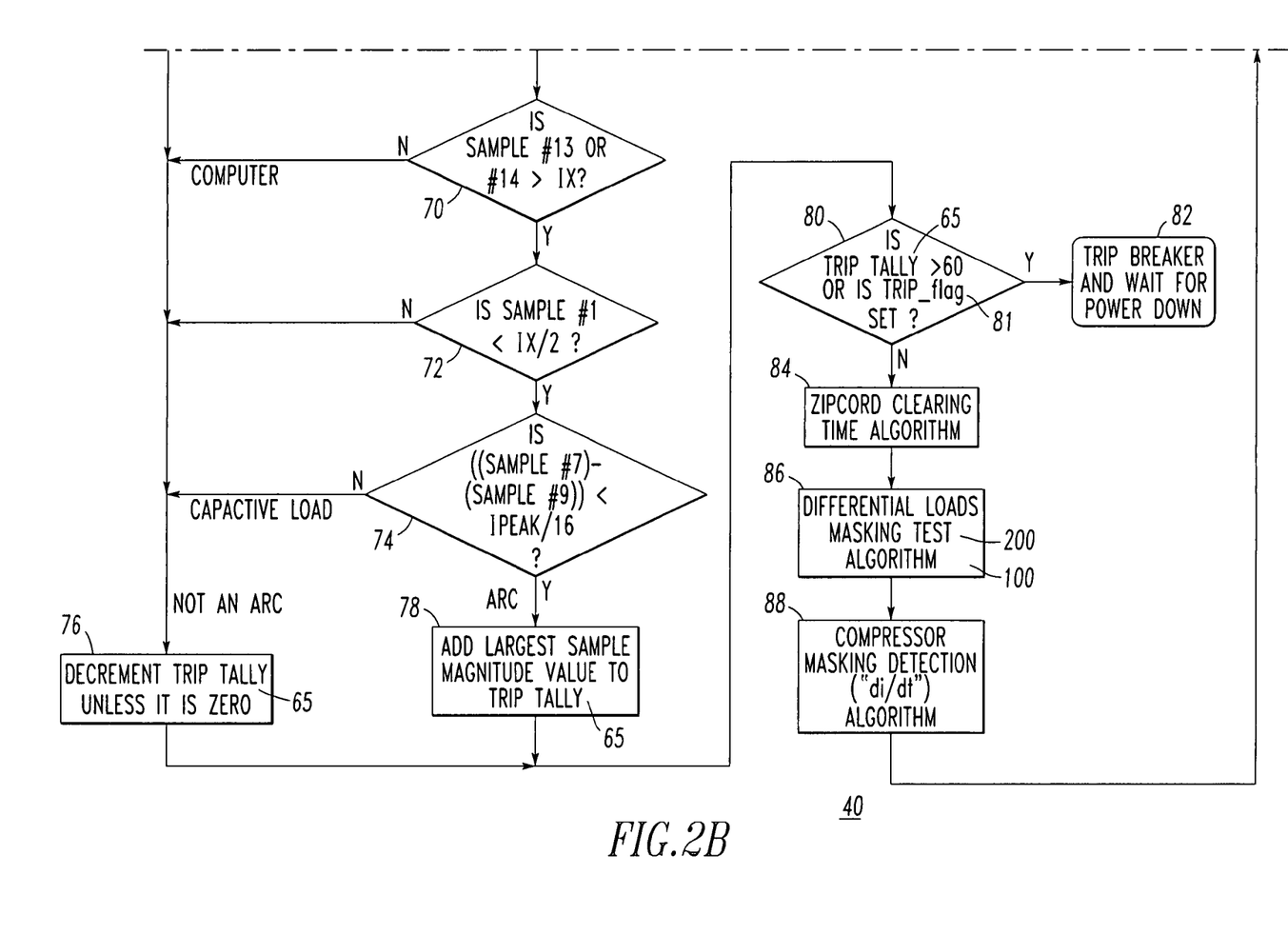

FIGS. 2A-2B show the clearing time algorithm 40 for the processor 24 of FIG. 1. This algorithm 40 is suitable for arc faults resulting from opposing electrodes (not shown) of a carbonized path arc clearing time test. First, at 52, the algorithm 40 initializes the processor 24 of FIG. 1, before it clears, at 54, current sample arrays 56,56m,58,58m. Next, at 60, the algorithm 40 copies the values from the current arrays 56,56m to the previous arrays 58,58m, respectively. Then, the algorithm 40 collects the two current sets of the current samples in the arrays 56 (sample), 56m (msample) from the respective analog inputs 42,43 of FIG. 1. In this example, a count (e.g., x+1) of the samples of the sensed current for a current one of the line cycles is about 19 (e.g., sample #0 (or sample (0) of the array 56) through and including sample #18 (or sample (18)). The line cycles, such as 61, include a positive half cycle 61P and a negative half cycle 61N. Preferably, the algorithm 40 collects the samples of the sensed current 22 (FIG. 1) for the current one of the line cycles substantially during the positive half cycle 61 P and during the start of the negative half cycle 61N, and processes the samples of the sensed current for the current one of the line cycles, in order to generate the second trip signal 25 (FIG. 1) during the negative half cycle 61N. In this example, the line voltage and the sensed current are in phase, and the algorithm 40 collects about 19 of the samples of the sensed current for the current one of the line cycles at a rate of about 32 samples per line cycle. Alternatively, the sensed current may lead or lag the line voltage. The algorithm 40 collects a first one of the samples (sample #0) of the sensed current at about the positive zero crossing 61 PZ of the line cycle of the line voltage, as sensed from analog input 44 (voltage) (FIG. 1). For example, the processor 24 employs an edge-triggered interrupt (not shown) that responds to the positive zero crossing 61 PZ.

For example, if N is an integer, such as 8, then the algorithm 40 collects about 2N plus three (=19) of the samples of the sensed current for the current one of the line cycles. The algorithm 40 collects an (N+1)th one (e.g., 9th) (e.g., sample #8) of the samples of the sensed current at about the positive peak of the positive half cycle 61P of the line voltage. The capacitive di/dt is maximum (positive) at the line voltage positive peak, while resistive di/dt is zero. The algorithm collects a (2N+1)th one (e.g. 17th) (e.g., sample #16) of the samples of the sensed current at about the negative zero crossing 61NZ of the line cycle of the line voltage. In this example, two additional samples (e.g., sample #17 and sample #18) are collected during the negative half cycle 61N.

Although the processor 24 of FIG. 1 inputs, converts and stores the values substantially during the positive half cycle 61P plus a relatively small portion of negative half cycle 61N, with subsequent processing in the subsequent portion of negative half cycle 61N, this could be reversed. The processor 24 provides a suitable analog-to-digital conversion (e.g., without limitation, about 16 counts per ampere) of the sensed current values 22 (FIG. 1) to the digital values in the arrays, such as 56.

Next, at 62, the algorithm 40 determines a total current value (Ipeak) 63, which is the peak or maximum current of the first seventeen values of the current array 56. If the total current value is greater than 45 A, then, at 64, a trip tally 65 is cleared, since the current samples in the array 56 do not represent a low level arc. After step 64, execution resumes at 76 (FIG. 2B). Otherwise, if the total current value is less than 45 A, then execution resumes with the test at 66. If any of the tests at even steps 66-74 fail, then, again, the current samples in the array 56 do not represent an arc and execution resumes at 76. However, if all of the tests at even steps 66-74 pass, then the current samples in the array 56 do represent an arc and execution resumes at 78 (FIG. 2B).

At 66, it is determined if any of the first seventeen current samples in the current array 56 are greater than 1 A. If so, then at 67, a value, Ix, is determined to be the larger of Ipeak/8 or 0.5 A. Next, at 68, it is determined if the sixteenth and seventeenth samples in the current array 56 are both less than Ix. If so, then at 70, it is determined if either the fourteenth or the fifteenth samples in the current array 56 are greater than Ix. If not, then the load is a computer; but, if so, then at 72, it is determined if the second sample in the current array 56 is less than one half of Ix. If so, then at 74, it is determined if the eighth sample less the tenth sample in the current array 56 is less than one sixteenth of Ipeak. If not, then there is a capacitive load. On the other hand, since all of even tests 66-74 have passed, then the load is an arc and execution resumes at 78.

If there was no arc, then step 76 decrements the trip tally 65 by one, unless such trip tally was already zero. Hence, the trip tally 65 is greater than or equal to zero. Otherwise, if there was an arc, then, step 78 adds the total current value (Ipeak) 63, which is the peak or maximum current of the first seventeen values of the current array 56, to the trip tally 65.

After either of the steps 76,78, at 80, it is determined if the trip tally 65 is greater than a suitable threshold (e.g., 60) or if a TRIP_flag 81 (routine 86) was set. If so, then, at 82, the circuit breaker 2 of FIG. 1 is tripped by asserting the second trip signal 25 (FIG. 1), after which the processor 24 awaits power down, since the separable contacts 14 (FIG. 1) and the source of power (not shown) therefrom is to be removed. On the other hand, if the trip tally 65 is not greater than its threshold (e.g., 60) and if the TRIP_flag 81 was not set, then three routines 84, 86 and 88 are sequentially executed before execution resumes at 60 (FIG. 2A). Routine 84 provides a suitable zip cord clearing time algorithm. Routine 86 provides a suitable differential loads masking test. Routine 88 provides a suitable compressor masking detection (di/dt) algorithm.

Figure 3:
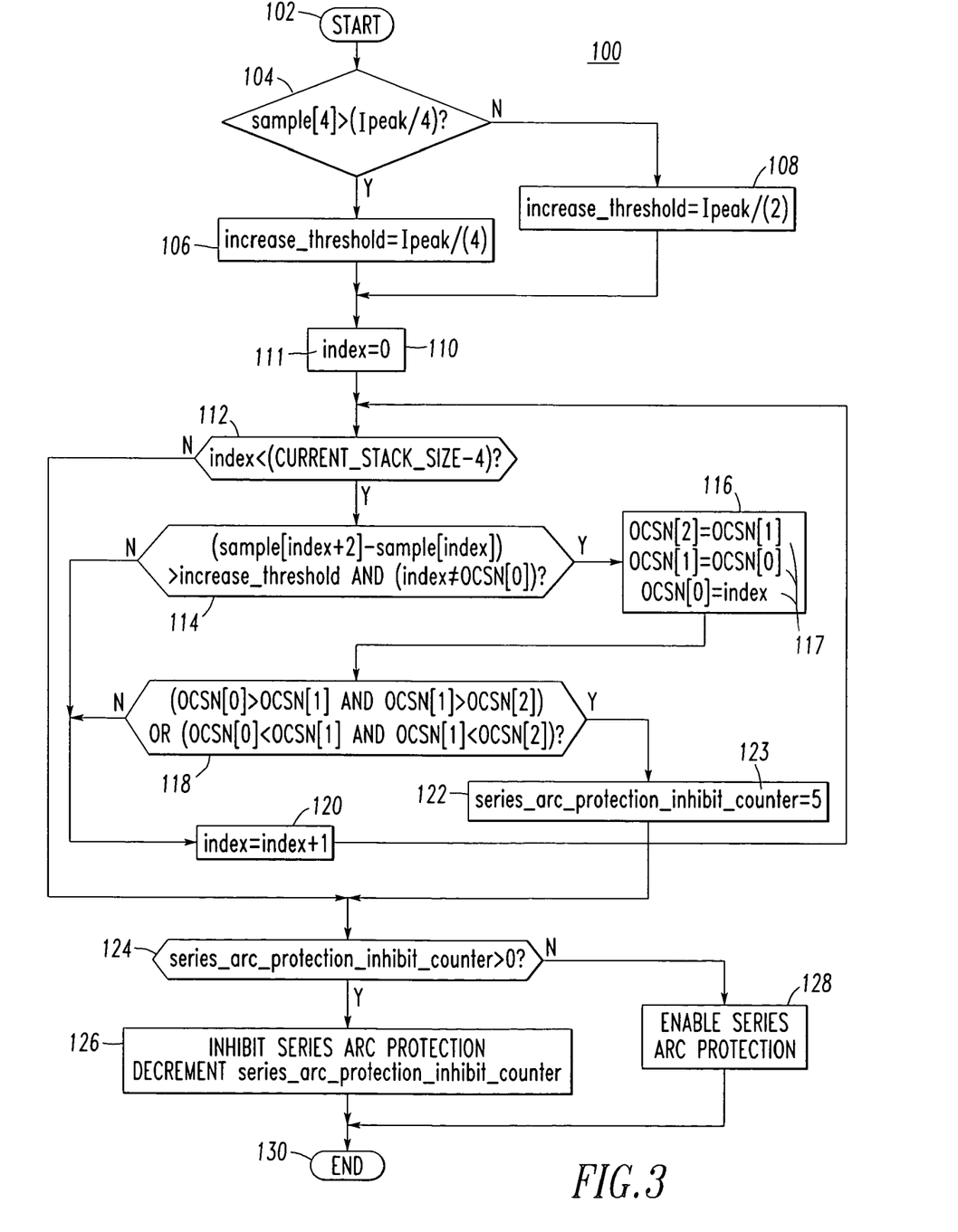
FIG. 3 is a flowchart of a routine to enable or disable series arc protection as executed by the processor of FIG. 1.

Referring to FIG. 3, a routine 100 to enable or disable series arc protection on a dimmer phase angle change is executed by the processor 24 of FIG. 1. The routine 100 starts at 102 and, then, at 104, determines if sample[4] of the array 56 (FIG. 2A) is greater than one-fourth of the total current value (Ipeak) 63 (FIG. 2A). This employs a suitable rough measure of the current phase angle (e.g., sample[4] occurs at about 458, since sample [0] occurs at about 08 and sample [16] occurs at about 1808), in order to set a suitable value for a dimmer current "increase_threshold". If the test at 104 passes, then at 106, increase_threshold is set to one-fourth of Ipeak. Otherwise, if the test fails, then increase_threshold is set to one-half of Ipeak at 108. Next, after 106 or 108, at 110, a variable index 111 is set to zero.

A loop formed by even steps 112-122 sorts through the array 56 (sample[]) of FIG. 2A to determine a present value of onset of current conduction ("onset of conduction sample number" or OCSN). At 112, it is determined if index is less than CURRENT_STACK_SIZE (e.g., without limitation, 19 in this example) less four. If not, then the loop is completed and execution resumes at 124. Otherwise, at 114, it is determined if sample[index+2] less sample[index] is greater than increase_threshold, and if index is not equal to the first ($0^{th}$) (or newest) entry of a first-in first-out (FIFO) array OCSN[] or OCSN[0]. If this test passes, which means that the present value of OCSN is different from the previous value of OCSN (OCSN[0]), then step 116 stores the present value of OCSN (i.e., index) in the first-in element of the three-deep FIFO array (OCSN[0]) and updates the other two elements of that array (i.e., OCSN[2]=OCSN[1] and OCSN [1]=OCSN[0]). Next, at 118, since the OCSN has changed, the FIFO array 117 is checked to determine if the three most recent values of OCSN are trending in a consistent direction (i.e., either all are increasing or all are decreasing). If not, then at 120, the value index is incremented and step 112 is repeated. On the other hand, if the three most recent values of OCSN are consistently trending, then the load is assumed to be a dimmer with a changing phase angle. Therefore, a flag is set, at 122, to inhibit one or more series arc protection algorithms. In this example, a counter 123 (series_arc_protection_inhibit_counter) is preset to 5.

After 122, or if the test at 112 fails, at 124, it is determined if the counter 123 (series_arc_protection_inhibit_counter) is greater than zero. If so, then at 126, series arc protection is inhibited and the counter 123 (series_arc_protection_inhibit_counter) is decremented. Preferably, one or more preselected series arc detection algorithms (e.g., without limitation, an arc fault algorithm which evaluates cycle-to-cycle changes in load current) are inhibited or disabled. Otherwise, at 128, all series arc detection algorithms are enabled. After 126 or 128, the routine 100 exits. The routine 100 executes once per line cycle at routine 86 of FIG. 2B.

The processor 24 of FIG. 1 samples the line current amplitude in the array 56 (sample[]) nineteen times (e.g., without limitation, at intervals of about 520.833 μs, e.g., at 60 Hz line frequency), starting with the positive going zero-crossing 61 PZ of the line voltage. The samples include sixteen evenly spaced current samples (sample[0] through sample[15]) that correspond with each line voltage positive half cycle 61P, plus three additional current samples (sample [16] through sample[16]) at the beginning of the negative voltage half cycle 61N. After the samples are collected (and before the next positive going zero-crossing of the line voltage), the processor 24 processes the sampled current information to look for characteristics that indicate series arcing. One of the first things that the processor 24 does is to attempt to determine the likely type of load (e.g., as is discussed below in connection with FIG. 10). If the processor 24 determines that the load is most likely a dimmer, then it identifies (step 114) the sample number that corresponds to the OCSN. One of the samples of the sensed current in the array 56 is associated with a step increase in current associated with a dimmer-controlled load. For example, if the dimmer current begins conducting at the 458 point of the line voltage waveform, then the corresponding OCSN is 4. As another example, for the 908 point, the corresponding OCSN is 8.

Any value of OCSN that is different from the OCSN of the immediately previous electrical cycle is stored in the three-deep FIFO array 117. Each time a new OCSN is stored, the previous two values of OCSN in the array are checked, at step 118, to see if the OCSN has either increased twice consecutively or decreased twice consecutively. If so, this indicates that the dimmer phase angle is being changed and consequently series arc detection is inhibited, at 126, for a suitable period of time (e.g., without limitation, five electrical cycles) as defined at step 122.

EXAMPLE 1

Correctly identifying the OCSN is an important aspect of the present invention. For example, the OCSN may be identified by determining the maximum value of di/dt from the sampled current array 56.

EXAMPLE 2

Another way of detecting the OCSN is divided into two parts, as follows. First, at step 104, one fourth of the peak value 63 of the sampled current array 56 is compared to the fifth sample (sample[4]) of the sampled current array 56 to determine roughly the value of the OCSN. If sample[4] is greater than Ipeak/4, then the angle of onset of current conduction is less than 458. Otherwise, the angle of onset of current conduction is greater than 458.

Immediately following this comparison, the loop of even steps 112-122 scans through the array 56 of the most recently collected current samples for step increases in instantaneous current. When the angle of onset of current conduction is smaller (i.e., sample [4]>(peak current/4)), then the value of sample[index+2] less sample[index] is greater than (peak current/4) for the "index" value that will be identified as the OCSN at step 114. Otherwise, when the angle of onset of current conduction is larger (i.e., sample [4]<(peak current/4)), then the value of sample[index+2]

less sample[index] is greater than (peak current/2) for the "index" that will be identified as the OCSN.

The routine 100 determines that the phase angle consistently moves in the forward direction or the reverse direction for at least three of the line cycles. When the OCSN changes twice consecutively in the same direction, it is assumed that the phase angle of the dimmer is changing. The routine 100 sets the counter 123 equal to the number of line cycles that the series arc protection is to be inhibited (e.g., without limitation, five cycles). The counter 123 decrements once per electrical line cycle. While the counter is nonzero, series arc protection is inhibited. A changing dimmer phase angle can be mistaken as a series arc by some series arc protection algorithms. While dimmer current phase angles either remain constant or change in a predictable fashion, the phase angle of the current of an electrical load in series with an arc does not. The routine 100 looks for trends in the phase angle of the load current. If the phase angle is changing in a way that the trend is predictable, then series arc protection is inhibited.

FIGS. 4-7 show four examples of the operation of the routine 100 (FIG. 3) for a load being a dimmer controlling incandescent lighting (e.g., without limitation, an 800 W incandescent lighting load). Each of the examples plots dimmer current, the value of the OCSN as determined (e.g., at step 114) by the routine 100 (e.g., OCSN is directly proportional to phase angle and, hence, the value of OCSN goes from high to low when the brilliance of the lighting load is increased, and from low to high when the brilliance of the lighting load is decreased), an optional digital signal ("OCSN change flag") that is high when the OCSN value has changed from the previous cycle or that is low whenever OCSN is constant (this "OCSN change flag" need not be employed and is shown for convenience of illustrating the OCSN value), and the counter 123 ("series_arc_protection_inhibit_counter") employed to inhibit series arc protection.

Figure 4:
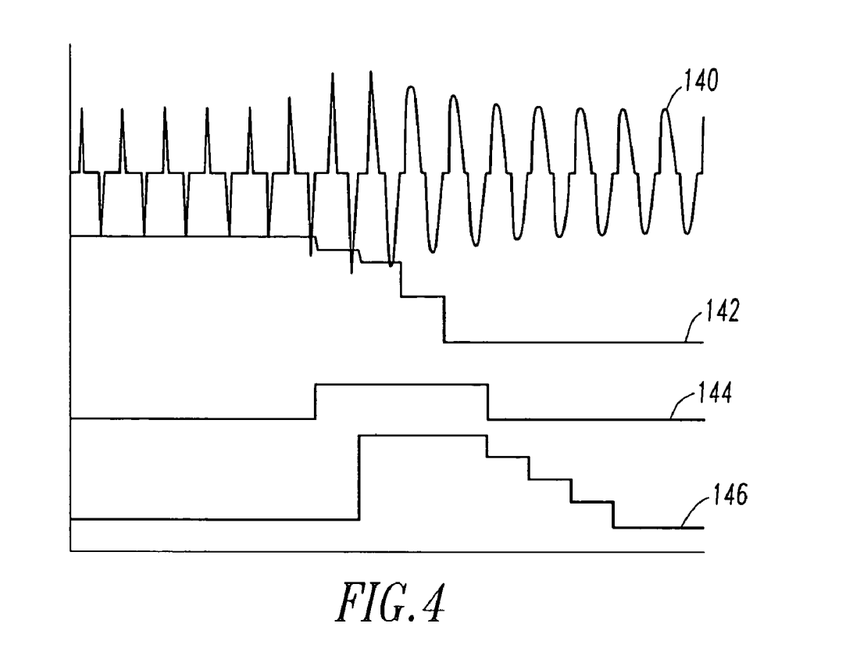
FIG. 4 is a plot of dimmer current, an onset of conduction sample number (OCSN), an optional "OCSN change flag" and a series arc protection inhibit counter as employed by the routine of FIG. 3 for a dimmer being adjusted in order that the brilliance of dimmer-controlled incandescent lighting increases relatively quickly.

FIG. 4 plots dimmer current 140, OCSN value 142, the optional "OCSN change flag" 144 and the value 146 of the counter 123 as employed by the routine 100 for a dimmer (not shown) being adjusted in order that the brilliance of dimmer-controlled incandescent lighting (not shown) increases relatively quickly. Whenever the OCSN value 142 changes, the processor 24 checks to see if OCSN has changed twice consecutively in the same direction. If so, then the counter value 146 is set equal to a suitable value (e.g., without limitation, five). The counter 123 (FIG. 3) decrements by one each electrical cycle. When the counter 123 is nonzero, series arc protection is inhibited.

Figure 5:
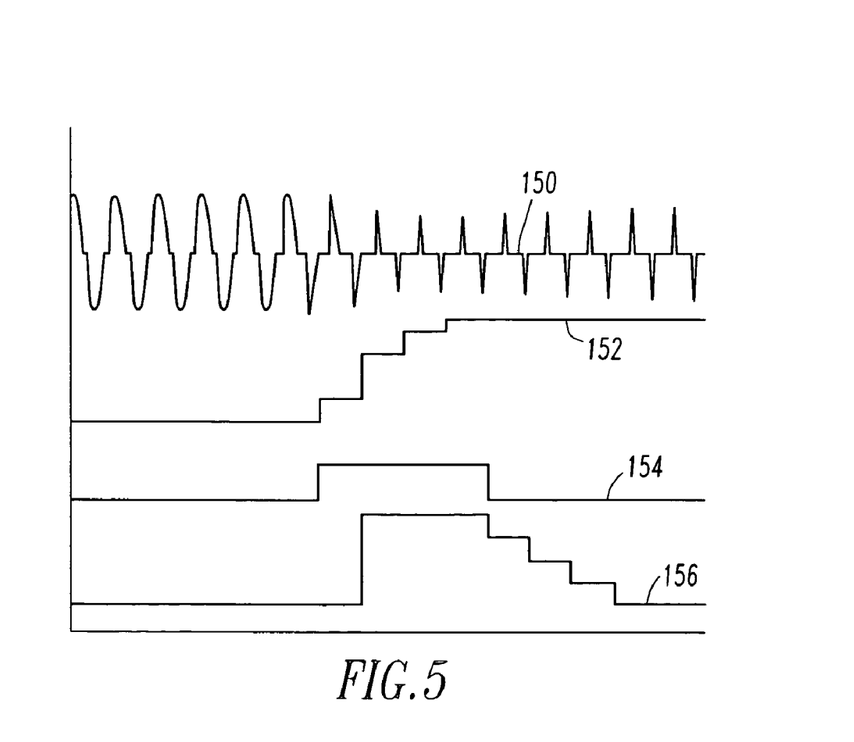
FIG. 5 is a plot similar to the plot of FIG. 4 except that the brilliance of the dimmer-controlled incandescent lighting decreases relatively quickly.

FIG. 5 plots dimmer current 150, OCSN value 152, the optional "OCSN change flag" 154 and the value 156 of the counter 123 as employed by the routine 100 for a dimmer (not shown) being adjusted in order that the brilliance of dimmer-controlled incandescent lighting (not shown) decreases relatively quickly.

Figure 6:
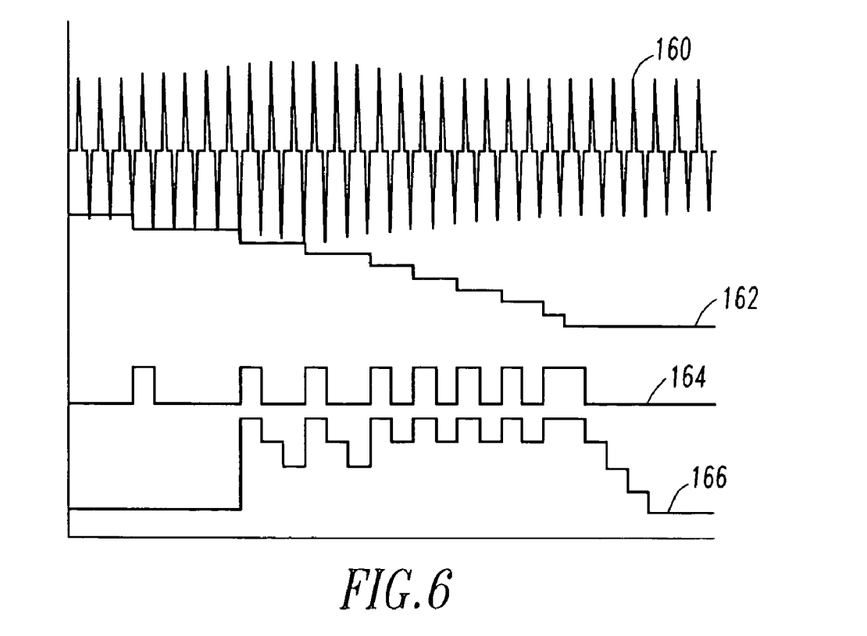
FIG. 6 is a plot similar to the plot of FIG. 4 except that the brilliance of the dimmer-controlled incandescent lighting increases relatively slowly.

FIG. 6 plots dimmer current 160, OCSN value 162, the optional "OCSN change flag" 164 and the value 166 of the counter 123 as employed by the routine 100 for a dimmer (not shown) being adjusted in order that the brilliance of dimmer-controlled incandescent lighting (not shown) increases relatively slowly.

Figure 7:
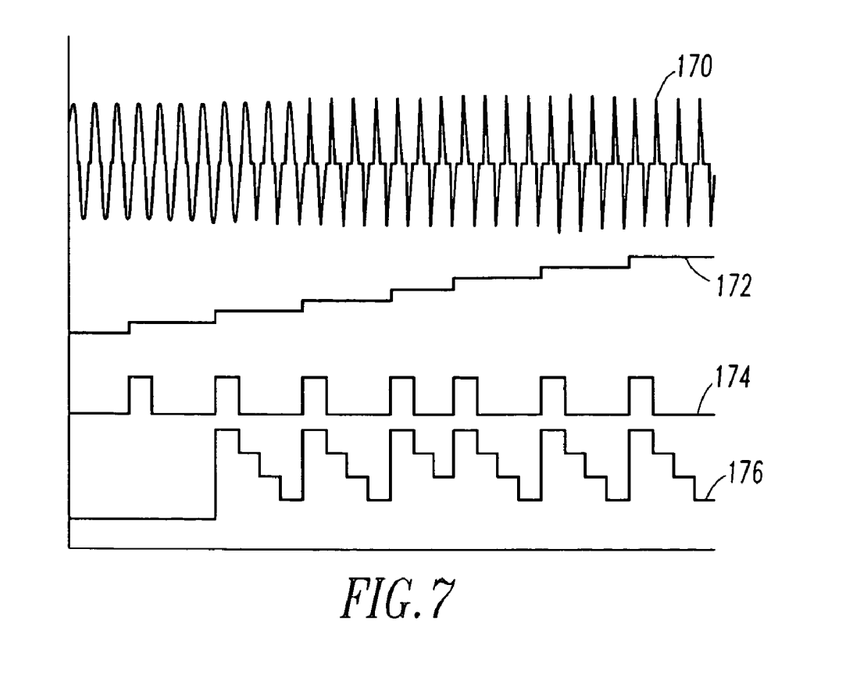
FIG. 7 is a plot similar to the plot of FIG. 4 except that the brilliance of the dimmer-controlled incandescent lighting decreases relatively slowly.

FIG. 7 plots dimmer current 170, OCSN value 172, the optional "OCSN change flag" 174 and the value 176 of the counter 123 as employed by the routine 100 for a dimmer (not shown) being adjusted in order that the brilliance of dimmer-controlled incandescent lighting (not shown) decreases relatively slowly.

Figure 8:
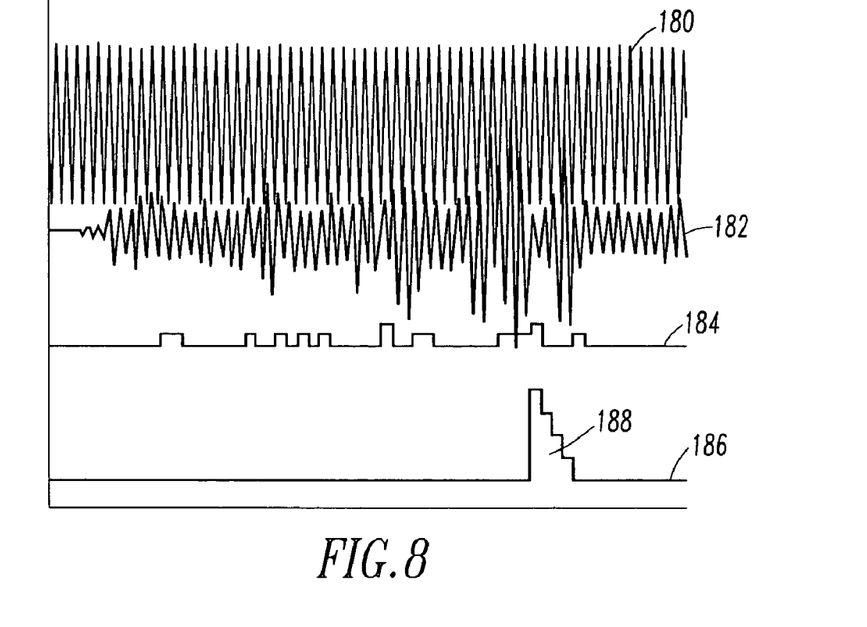
FIG. 8 is a plot of dimmer current, arc voltage, an onset of conduction sample number (OCSN) and the series arc protection inhibit counter as employed by the routine of FIG. 3 for dimmer-controlled incandescent lighting in series with a C—Cu arc generator.

FIG. 8 plots dimmer current 180, arc voltage 182, OCSN value 184 and the value 186 of the counter 123 as employed by the routine 100 of FIG. 3 for dimmer-controlled incandescent lighting (not shown) in series with a C—Cu arc generator (now shown). The arc voltage 182 is across the electrodes (not shown) of the C—Cu arc generator (e.g., a significant (non-zero) voltage appears across the arc generator electrodes when an arc is occurring). In this example, the dimmer (not shown) with an incandescent lighting load is in series with the C—Cu arc generator. The electrodes of the arc generator are opened relatively slowly, causing an arc to occur. In this example plot, the tripping function of the AFCI 2 (FIG. 1) is defeated in order to not disconnect the electrical circuit of the load 4 (FIG. 1) by tripping. Here, the arcing causes the OCSN value 184 to change in a random fashion. Since the OCSN value 184 does not trend in a consistent direction, the value 186 of the series arc protection inhibit counter 123 remains generally inactive during arcing except for one example active state at 188.

Figure 9:
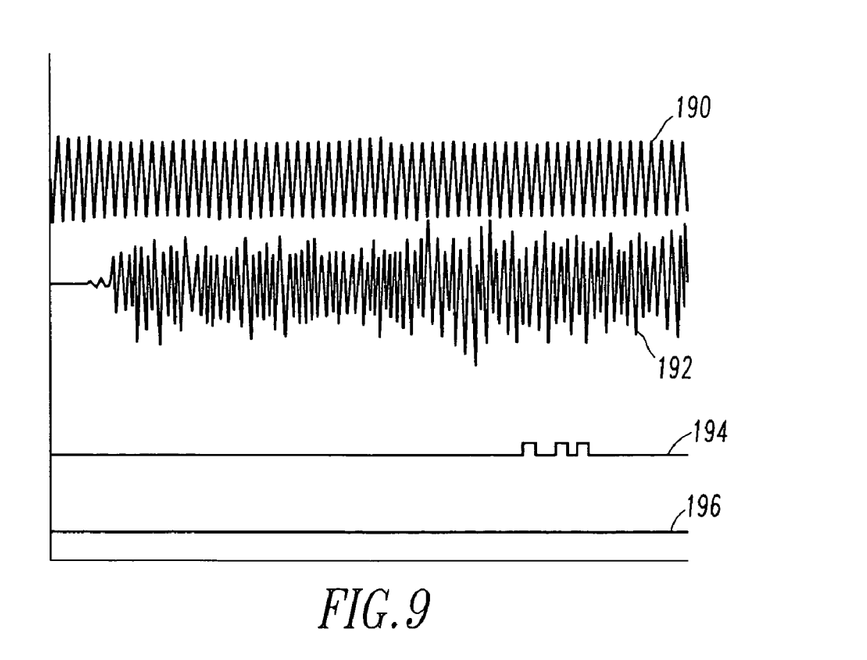
FIG. 9 is a plot of dimmer current, arc voltage, an onset of conduction sample number (OCSN) and the series arc protection inhibit counter as employed by the routine of FIG. 3 for a C—Cu arc generator in series with a 5 $A_{RMS}$ resistive load in which the OCSN does not fluctuate much during arcing and the series arc protection inhibit counter remains inactive.

FIG. 9 plots dimmer current 190, arc voltage 192, the OCSN value 194 and the value 196 of the series arc protection inhibit counter 123 (FIG. 3) as employed by the routine 100 (FIG. 3) for a C—Cu arc generator (not shown) in series with a 5 $A_{RMS}$ resistive load (not shown) in which the OCSN value 194 does not fluctuate much during arcing and the counter value 196 remains inactive.

Figure 10:
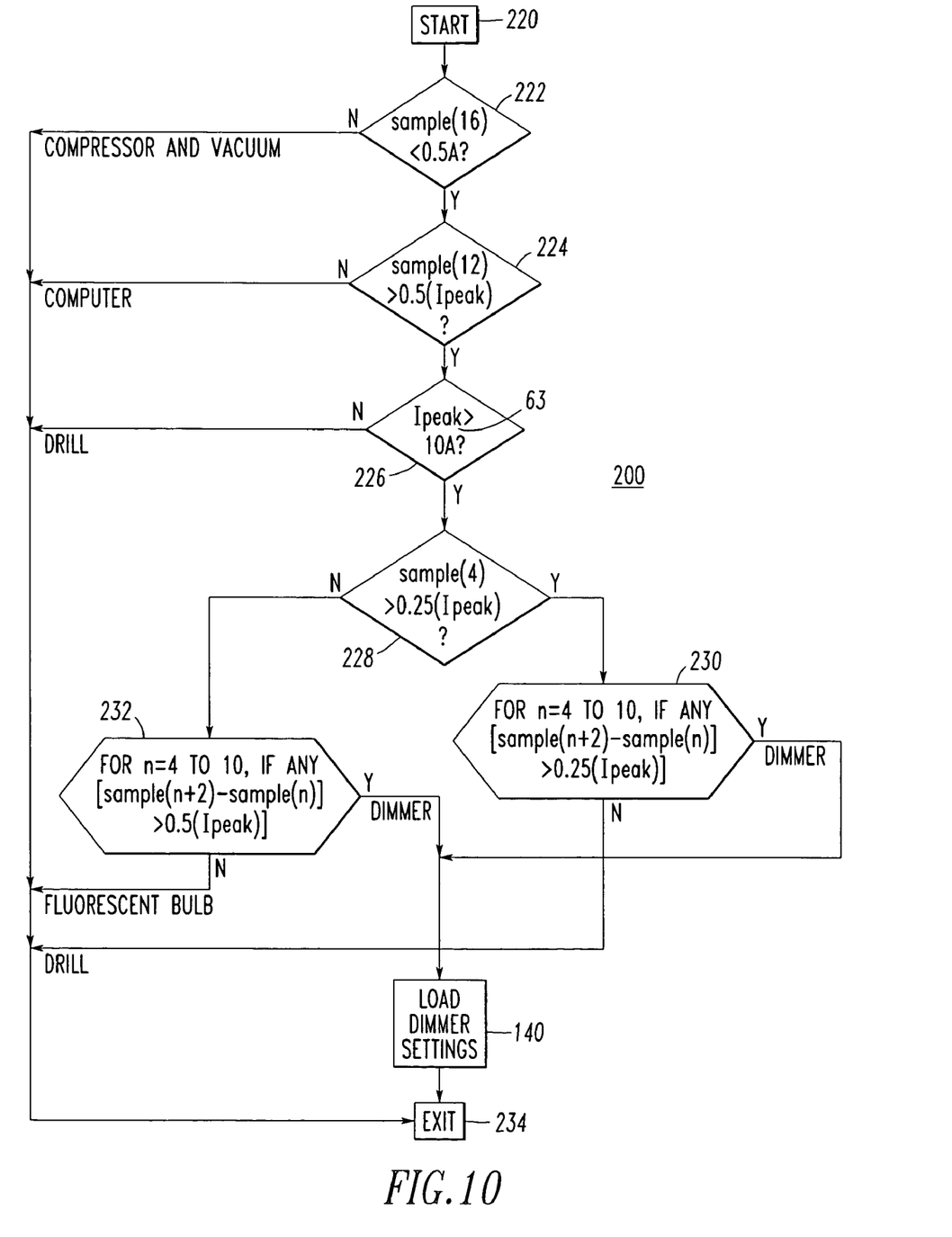
FIG. 10 is a flowchart of a dimmer detection routine for the differential loads masking test algorithm of FIG. 2B.

FIG. 10 shows a dimmer detection algorithm routine 200 as employed by the differential loads masking test 86 of FIG. 2B. After starting at 220, it is determined at 222 if the seventeenth sample (i.e., sample (16)) of the current array 56 of FIG. 2A is less than 0.5 A. If not, then the load may be one of a compressor or a vacuum cleaner, and the routine 200 exits at 234. If so, then at 224, it is determined if the thirteenth sample is greater than half of the peak current, Ipeak. If not, then the load may be a computer, and the routine 200 exits at 234. If so, then at 226, it is determined if Ipeak 63 is greater than 10 A. If not, then the load may be a drill, and the routine 200 exits at 234. If so, then at 228, it is determined if the fifth sample (sample (4)) is greater than one fourth of the peak current. If so, then 230 is executed; otherwise, step 232 is executed.

Step 230 looks at the fifth through the eleventh samples of the current array 56 of FIG. 2A. For each of those samples, it is determined if the difference between (a) a second one of those samples after the corresponding one of the fifth one of the samples through and including the eleventh one of the samples and (b) the corresponding one of the fifth one of the samples through and including the eleventh one of the samples, is greater than 0.25 times Ipeak. For example, if sample (6)–sample (4) is greater than 0.25 times Ipeak and/or if sample (12)–sample (10) is greater than 0.25 times Ipeak, then the test passes, the load is a dimmer and the routine loads the dimmer settings at 140 and exits at 234. If not, then the load may be a drill and the routine exits at 234.

Step 232 is very similar to step 230, except that the value being compared is 0.5 times Ipeak rather than 0.25 times Ipeak. If the test at 232 passes, then load is a dimmer and the routine loads the dimmer settings at 140 and exits at 234. If not, then the load may be a fluorescent bulb and the routine exits at 234. The exit 234 returns to the differential loads masking test 86 of FIG. 2B.

Although the example arc fault detection circuit 24 employs a microprocessor, it will be appreciated that a combination of one or more of analog, digital and/or processor-based circuits may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault circuit interrupter for an electrical circuit including a load, said arc fault circuit interrupter comprising:
   a line terminal;
   a load terminal;
   separable contacts electrically connected between said line terminal and said load terminal;
   a current sensor adapted to sense current associated with said load and flowing between said line terminal and said load terminal and through said separable contacts, said sensed current including a plurality of line cycles;
   at least one arc fault detection circuit adapted to provide series arc protection and to generate a trip signal responsive to said sensed current from said current sensor, one of said at least one arc fault detection circuit being adapted to collect a plurality of samples of said sensed current over said line cycles, determine that said load is a dimmer-controlled load, determine a phase angle at which said sensed current begins conduction within one of said line cycles, and determine that said phase angle consistently moves in a forward direction or a reverse direction and responsively inhibit said series arc protection;
   an operating mechanism adapted to open said separable contacts responsive to said trip signal; and
   wherein said samples are periodically collected over at least a portion of each of said line cycles; wherein each of said samples for one of said lines cycles is associated with an index number; wherein said one of said at least one arc fault detection circuit identifies one of said samples that corresponds to an onset of current conduction of said sensed current for said dimmer-controlled load for a current one of said line cycles, determines that said identified one of said samples is different from another one of said samples that corresponds to an onset of current conduction of said sensed current for said dimmer-controlled load for another one of said line cycles prior to said current one of said line cycles, and stores the index number of said identified one of said samples in a first-in first-out array having a plurality of elements.

2. The arc fault circuit interrupter of claim 1 wherein said first-in first-out array has at least three of said elements; and wherein said one of said at least one arc fault detection circuit further determines from said elements if said index number of said identified one of said samples that corresponds to an onset of current conduction of said sensed current for said dimmer-controlled load for the current one of said line cycles has either consecutively increased or has consecutively decreased.

3. The arc fault circuit interrupter of claim 2 wherein said index number of said identified one of said samples that corresponds to an onset of current conduction of said sensed current for said dimmer-controlled load for the current one of said line cycles has consecutively increased or has consecutively decreased; and wherein said one of said at least one arc fault detection circuit responsively inhibits said series arc protection during a predetermined time.

4. The arc fault circuit interrupter of claim 3 wherein said predetermined time corresponds to a duration of about five of said line cycles.

5. The arc fault circuit interrupter of claim 3 wherein said one of said at least one arc fault detection circuit includes a processor having a counter; and wherein said processor presets said counter with a count equal to a predetermined count of said line cycles, decrements said counter once for each of said line cycles, and inhibits said series arc protection when the count of said counter is not zero.

6. An arc fault circuit interrupter for an electrical circuit including a load, said arc fault circuit interrupter comprising:
   a line terminal;
   a load terminal;
   separable contacts electrically connected between said line terminal and said load terminal;
   a current sensor adapted to sense current associated with said load and flowing between said line terminal and said load terminal and through said separable contacts, said sensed current including a plurality of line cycles;
   at least one arc fault detection circuit adapted to provide series arc protection and to generate a trip signal responsive to said sensed current from said current sensor, one of said at least one arc fault detection circuit being adapted to collect a plurality of samples of said sensed current over said line cycles, determine that said load is a dimmer-controlled load, determine a phase angle at which said sensed current begins conduction within one of said line cycles, and determine that said phase angle consistently moves in a forward direction or a reverse direction and responsively inhibit said series arc protection;
   an operating mechanism adapted to open said separable contacts responsive to said trip signal; and
   wherein said sensed current has a phase angle; wherein one of said samples is associated with the phase angle of said sensed current; wherein said one of said at least one arc fault detection circuit determines a total current value from a peak current of said samples of said sensed current for a current one of said line cycles and compares a portion of said total current value to one of said samples; wherein if said one of said samples is greater than said portion of said total current value, then an onset of current conduction of said sensed current for said dimmer-controlled load is less than a predetermined phase angle; and wherein if said one of said samples is less than said portion of said total current value, then said onset of current conduction of said sensed current for said dimmer-controlled load is greater than said predetermined phase angle.

7. The arc fault circuit interrupter of claim 6 wherein after said one of said at least one arc fault detection circuit compares a portion of said total current value to a predetermined one of said samples, said one of said at least one arc fault detection circuit identifies one of said samples of said sensed current for the current one of said line cycles associated with a step increase in said current associated with said dimmer-controlled load.

8. The arc fault circuit interrupter of claim 6 wherein said one of said at least one arc fault detection circuit identifies that one of said samples corresponds to an onset of current conduction of said sensed current for said dimmer-controlled load for a current one of said line cycles by checking at least some of said samples;
   and wherein when said one of said samples is greater than said portion of said total current value and said onset of current conduction of said sensed current for said dimmer-controlled load is less than said predetermined phase angle, said one of said at least one arc fault detection circuit determines whether a later sample of said sensed current less an earlier sample of said sensed current is greater than a first predetermined portion of said total current value, and alternatively determines whether said later sample of said sensed current less said earlier sample of said sensed current is greater than a second predetermined portion of said total current value, said second predetermined portion being greater than said first predetermined portion.

9. A method of enabling or disabling series arc protection for an electrical circuit including a load, said method comprising:

provi­ding series arc protection for said electrical circuit;
sensing current associated with said load and flowing in said electrical circuit, said sensed current including a plurality of line cycles;
collecting a plurality of samples of said sensed current over said line cycles;
determining that said load is a dimmer-controlled load;
determining a phase angle at which said sensed current begins conduction within one of said line cycles;
determining that said phase angle consistently moves in a forward direction or a reverse direction and responsively inhibiting said providing series arc protection;
periodically collecting said samples over at least a portion of each of said line cycles;
employing an index number with each of said samples for one of said lines cycles;
identifying one of said samples that corresponds to an onset of current conduction of said sensed current for said dimmer-controlled load for a current one of said line cycles;
determining that said identified one of said samples that corresponds to an onset of current conduction of said sensed current for said dimmer-controlled load for a current one of said line cycles is different from another one of said samples that corresponds to an onset of current conduction of said sensed current for said dimmer-controlled load for another one of said line cycles prior to said current one of said line cycles; and
storing the index number of said identified one of said samples in a first-in first-out array having a plurality of elements.

10. The method of claim 9 further comprising employing said first-in first-out array having at least three of said elements; and
determining from said elements if said index number of said identified one of said samples that corresponds to an onset of current conduction of said sensed current for said dimmer-controlled load for the current one of said line cycles has either consecutively increased or has consecutively decreased.

11. The method of claim 9 further comprising employing said index number of said identified one of said samples that corresponds to an onset of current conduction of said sensed current for said dimmer-controlled load for the current one of said line cycles that has consecutively increased or has consecutively decreased; and
inhibiting said providing series arc protection during a predetermined time.

* * * * *